Jan. 14, 1969  H. R. ASK  3,421,719
LIGHTWEIGHT AUTOMATIC FLIGHT CONTROL MECHANISM
Filed Sept. 11, 1967  Sheet 1 of 2
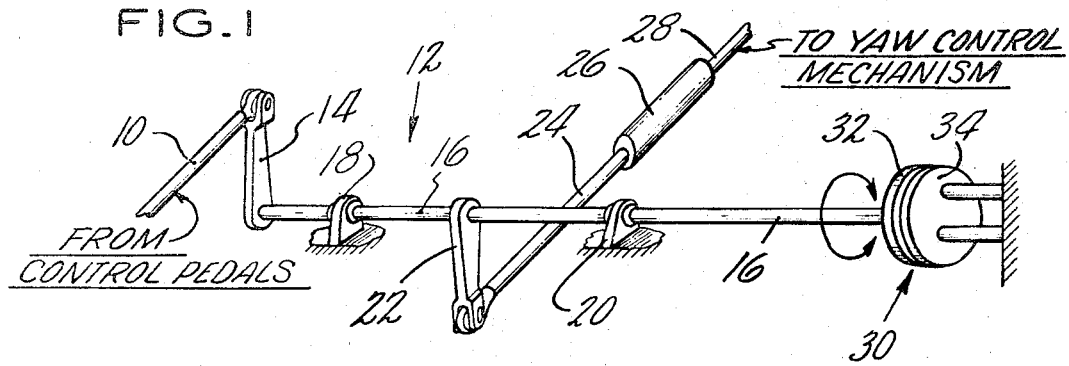
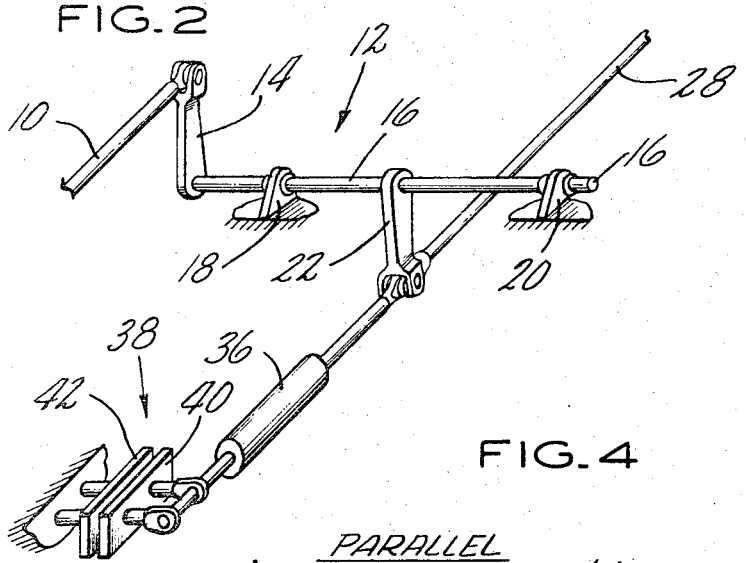
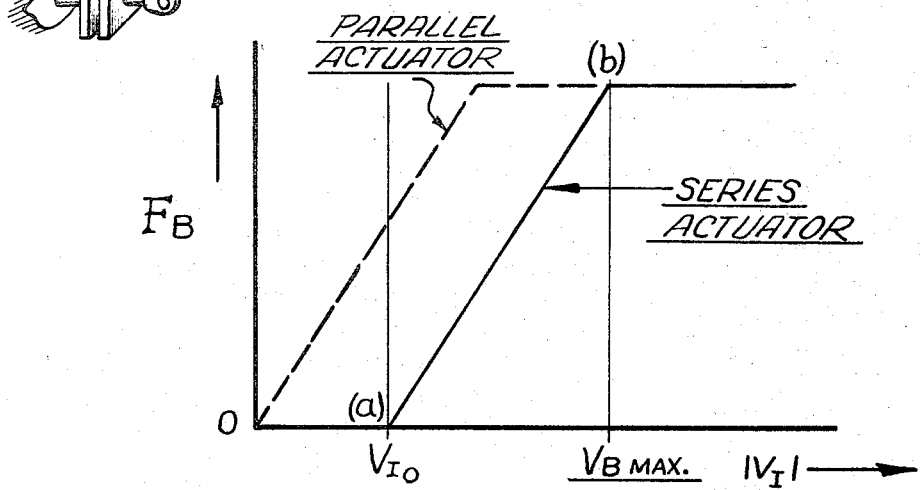
INVENTOR
HENRY R. ASK
BY
ATTORNEY

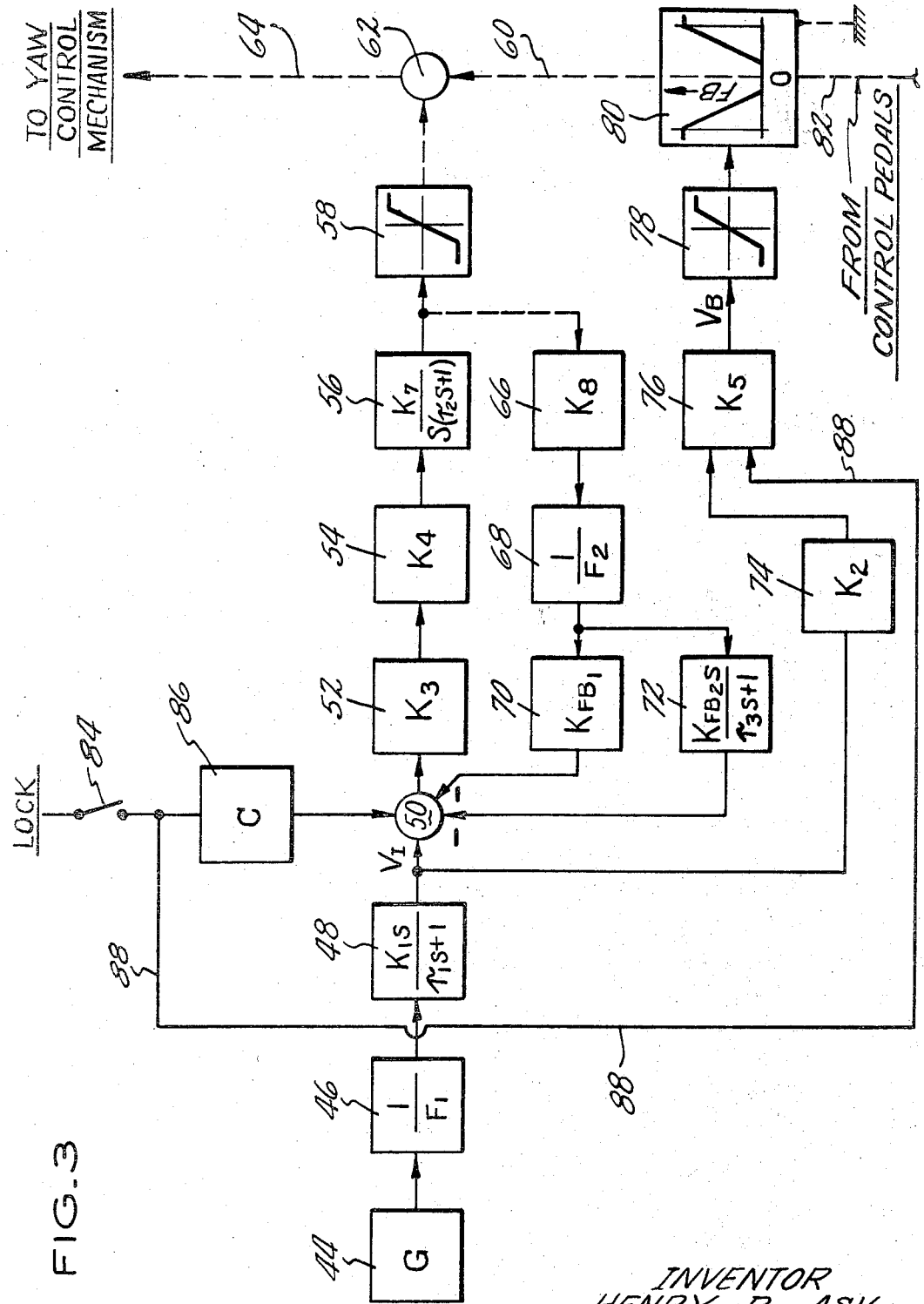

United States Patent Office 3,421,719
Patented Jan. 14, 1969

3,421,719
LIGHTWEIGHT AUTOMATIC FLIGHT CONTROL MECHANISM
Henry R. Ask, Wapping, Conn., assignor to United Aircraft Corporation, East Hartford, Conn., a corporation of Delaware
Filed Sept. 11, 1967, Ser. No. 666,619
U.S. Cl. 244—78    12 Claims
Int. Cl. B64c *13/36;* B64c *13/40;* B64c *17/00*

ABSTRACT OF THE DISCLOSURE

This invention relates to a lightweight aircraft control system in which autopilot command signals are introduced into a pilot-operated control linkage. The apparatus includes an actuator connected mechanically to the control linkage and an adjustable slip clutch, or brake, mechanically grounding the actuator to the aircraft and permitting the pilot to override the actuator. The grounding force generated by the slip clutch is modulated in response to the autopilot command signal to match the control load generated by the actuator.

Background of the invention

This invention relates to an automatic flight control system in which command signals are introduced into a pilot-operated control linkage.

Contemporary flight control input implementation for aircraft employing stability augmentation and navigational aids generally takes the form of a limited authority series actuators controlled by appropriate sensing instruments. Presently, the system is employed only when hydraulic boost actuators are available. In smaller aircraft especially, it becomes economically unfeasible to incorporate a hydraulic system with all of its heavy equipment simply to introduce autopilot signals. Electrical actuators, on the other hand, can be conveniently powered from the electrical power supplies of the aircraft without appreciably increasing their present capacity and without adding an excessive additional weight. It is desirable, therefore, to employ electrical actuators to introduce autopilot command signals.

In previous systems incorporating hydraulic boost actuators, some form of differential linkage could be employed to introduce autopilot signals without force feedback into the pilot's control linkage because the hydraulic actuator is essentially an irreversible motor. In lighter systems where no hydraulic actuator is incorporated, however, the simple addition of an electrical actuator through a differential linkage will normally result in force feedback to the pilot's controls whenever a command signal is introduced into the control linkage. Such force feedback becomes noxious to the pilot and also, if the pilot does not restrain the feedback forces, the accuracy of the command inputs is lost.

In another approach which employed electrical actuators alone to introduce command signals into a pilot-operated control linkage, the electrical actuator operated in parallel with the pilot's controls. Such systems, however, would not only drive the control surfaces but would also drive the pilot's controls. The pilot had to release his stick or pedals whenever the actuator was engaged and controlling the aircraft. This was undesirable since the pilot could not maintain control of the aircraft while the small stabilizing commands were introduced by the autopilot. For safety reasons these systems incorporated a form of slip clutch between the actuator and the pilot-operated control linkage which would permit the pilot to override the actuator in the event of an autopilot failure which might generate a "hard-over" command.

Summary of the invention

This invention employs an actuator to introduce an autopilot command into a pilot-operated control linkage without the need for a heavy auxiliary hydraulic system and also eliminates any noxious feedback force or motion to the pilot's controls from the actuator. The actuator can be positioned in series with the pilot-operated control linkage or may be positioned to operate in parallel with the pilot's controls. The actuator may be driven from an existing power system in the aircraft and is mechanically gorunded to the aircraft by means of a slip clutch, or brake, which reacts the control loads introduced into the pilot-operated control linkage against the aircraft. Alternately, the clutch may be placed between a fixed actuator and the control linkage. The slip clutch is an adjustable device which permits the pilot to override the actuator and permits the mechanical grounding force to be varied in response to the command signal applied to the actuator. The net result is that the force generated by the actuator is matched or exceeded by the clutch so that the control signal can be introduced and the pilot may override the actuator with the least possible effort when a control signal is introduced.

The slip clutch is a magnetic dry particle type and is controlled to vary the force at which the clutch will slip in direct proportion to the actuator signal. When no signal is applied to the clutch, the clutch is free to slip and consequently the actuator, connected to the pilot's control linkage, will impose no restraint on movements of the linkage introduced by the pilot. Effectively, any restraint imposed by the slip clutch will only be that necessary to react the control loads applied to the pilot-operated control linkage by the actuator. In addition, the invention includes a limiter in the driving means for the slip clutch to prevent the grounding force from ever exceeding a maximum value which can be manually overridden by the pilot.

The invention contemplates the use of the actuator and clutch arrangement in any of the control axes of fixed wing or vertical-take-off-and-landing (VTOL) type aircraft, such as helicopters. The actuator is particularly useful in a yaw damping system where a damping signal may be intermittently generated to stabilize the aircraft. An additional provision which is particularly useful in the yaw rate damping system is a heading command lock switch which engages the clutch at the maximum load value permitted by the limiter in the driving means in order to introduce a heading command signal into the actuator.

Brief description of the drawings

FIG. 1 shows an actuator in series with the pilot-operated control linkage and a rotary clutch for grounding the actuator.

FIG. 2 shows an actuator in parallel with the pilot-operated control linkage with a linear clutch for grounding the actuator.

FIG. 3 is a functional diagram showing a driving arrangement for the actuator and the clutch.

FIG. 4 is a diagram showing the relationship of the operating voltage of the clutch and the holding force of the clutch.

Description of the preferred embodiments

A pilot-operated control linkage in which the invention may be incorporated is shown in FIG. 1. The linkage may be employed in any of the control channels of an aircraft to which a stabilizing or navigational signal is to be introduced. Since the present invention is particularly suited to a yaw control damping system, the control linkage is shown as originating from the pilot's control pedals and leading to a yaw control mechanism. An input rod 10 leads from the pilot's pedals to a bellcrank 12 having an input arm 14 connected to a torque rod 16 which is journaled in two bearings 18 and 20. The bearings 18 and 20 are rigidly mounted to the airframe of the aircraft. An output arm 22 of the bellcrank 12 is connected to the torque rod 16 and transmits the yaw commands from the pilot's pedals through push rod 24, a servoactuator 26, and a push rod 28 to a yaw control mechanism such as the rudder of an aircraft or the tail rotor of a helicopter.

Connected to an extension of the torque rod 16 is a rotary brake or slip clutch 30. The terms "clutch" and "brake" are synonymous in this disclosure. The clutch 30 has a rotatable input element 32 connected to the torque rod 16 and a stationary element 34 which is mechanically fixed, or grounded, to the aircraft. The slip clutch 30 is of the magnetic dry particle type which will transmit between the elements 32 and 34 a torque proportional to an electrical signal which energizes its magnetic coils. As the signal energizing the coil increases, the torque which the clutch is capable of resisting increases. Such clutches are well known in the aircraft art and are available from a number of manufacturers such as Vibrac Corporation of Chelmsford, Mass.

The actuator 26 may be an electrical motor with a jackscrew output member. The actuator 26 is self-locking when no command signal is driving the motor and the output member is movable with respect to the actuator housing when a command signal is driving the motor. The actuator, therefore, is an extendible link in series with the pilot-operated control linkage. Command signals generated by a control instrument such as a yaw rate gyro are applied to the actuator and added to any commands that the pilot would have introduced. Since the actuator is normally introducing a very small command signal, and since the pilot should always be able to override the actuator for safety reasons, the series actuator may be limited to ±15% of the pilot's control authority.

It is readily apparent that control loads generated by the actuator 26 would be reacted against the pilot's pedals through rod 24, bellcrank 12 and rod 10 unless some intervening mechanism is employed between the actuator and the pilot to react these control loads against the airframe. Consequently, the clutch 30 is interposed between the actuator and the pilot and absorbs any control loads which the actuator generates. Since the clutch is connected directly to a point in the pilot's control linkage, the clutch in an engaged condition will also resist forces in the control linkage introduced by the pilot up to the torque level at which the clutch is set.

An important feature of this invention is the manner in which the resisting torque of the clutch is controlled. Since the control loads between the actuator and the linkage leading to the yaw control mechanism are generally directly proportional to the control signal introduced by the actuator, the clutch can also be driven with the same control signal to create a resisting torque sufficient to match, or exceed by a small amount, the control loads which would otherwise be reacted against the pilot. By limiting the load which the clutch will restrain, the pilot will always be able to override the actuator with the least possible effort, but never has to contend with the noxious feedback forces or motions caused by the actuator 26. Since stabilizing signals are usually intermittent, the on-off nature of the clutch operation will not interfere with normal recentering action of the pilot's control linkage.

An alternate embodiment of the invention may employ a linkage which operates in parallel with the pilot-operated control linkage as shown in FIG. 2. Corresponding members of the control linkage carry the same numeral designations as in FIG. 1. The series actuator and the rotary clutch have been replaced by the parallel actuator 36 and a linear clutch 38 which grounds the actuator 36 to the aircraft through a movable element 40 connected to the actuator 36 and a stationary element 42 connected to the aircraft. The actuator in this embodiment can be identical to the actuator shown in FIG. 1; however, in this embodiment the actuator 36 will move the pilot's control pedals as well as the balance of the pilot-operated control linkage when command signals are introduced. For this reason, the pilot must remove his feet from the control pedals while the actuator is moving or he must contend with the motion which would result from the parallel actuator operating in response to command instrument such as a gyro. The linear slip clutch 38 could take the same form as the magnetic dry particle clutch 30 in FIG. 1 so that it will be capable of reacting the control loads of the parallel actuator 36 against the airframe with a force varied in accordance with the command signals introduced into the actuator 36.

In still another embodiment employing a parallel configuration, the linear slip clutch 38 could be located between a parallel actuator which is fixed to the airframe and the pilot-operated control linkages. In such case, both elements 40 and 42 would be movable in that one element would be connected to the output member of the actuator and the other element would be connected to the pilot-operated control linkage.

With the exception of the feedback motion to the pilot's pedals, the systems disclosed in FIGS. 1 and 2 operate in essentially the same manner. In both embodiments, the pilot can override the actuator with the least possible effort. Those skilled in the art will recognize that the rotary slip clutch 30 and the linear clutch 38 could be readily adapted to operate with either the series actuator 26 or parallel actuator 38.

One system for operating the actuator and slip clutch is shown in the functional diagram of FIG. 3. This diagram shows the invention as it might be employed in a yaw rate damping control system. The primary source of the control signal is a yaw rate gyro 44. This gyro produces a signal proportional to the rate of change of the directional attitude of the aircraft. The signal is processed through a demodulator 46 and is transmitted to a high-pass filter 48 to eliminate steady-state rate signals. These signals are generated, for example, when the pilot executes a turn. Opposing signals from the rate gyro would not be desirable in such cases. The differentiating characteristic of the filter will prevent the steady-state rate signal from reaching the actuator. The filter may also introduce a lag into the command signal to obtain a lagger-rate transfer characteristic for the damping system. The typical transfer function for the damping system is $$\frac{Ks}{\tau s + 1}$$

A typical value for the time constant $\tau$ would be approximately one second. As long as the rest of the servo controls produce a rapid response, the lag can be obtained by setting $\tau_1$ of the filter 48 equal to one second. The system transfer function, therefore, could be established primarily by the high-pass filter 48.

The control signal at this point, $V_I$, passes through a summing amplifier 50, a preamplifier 52 and amplifier 54 to the servoactuator and gear train represented at 56 and 58. The limiter characteristic at 58 represents the mechanical limits of the actuator. The force output of the actuator is added in the series embodiment (FIG. 1) with that force 60 in the pilot's control linkage at the mechanical summing point 62 to operate the yaw control mechanism with the combined force 64.

A feedback loop from the output of the actuator incorporates a linear variable differential transformer 66 (LVDT), demodulator 68 and feedback amplifier 70. In the event that the lag is not implicitly developed within the high-pass filter 48, a lead network 72 in the feedback loop can be incorporated as shown in order to lag the signal in the forward loop of the control system. If $\tau_1$, $\tau_2$, and $\tau_3$ are in the order of hundreths of a second, the gain of the feedback loop, $K_{FB_2}/K_{FB_1}$, may be used to establish this lag. In the typical case $K_{FB_2}/K_{FB_1}$ would also be approximately one second.

The driving signal for the slip clutch is taken from the output $V_I$ of the high-pass filter 48. The signal is processed through preamplifier 74, amplifier 76 and a limiter 78. For safety reasons, it is desirable that the pilot always be capable of overriding the signals introduced by the servoactuator 58. It is for this reason that the limiter 78 is incorporated in the system. By limiting the level of the signal passing from the amplifier 76 to the clutch 80, the limiter 78 establishes a maximum load on the pedals, typically 15 lbs., which will slip the clutch 80. Alternately, the limiting feature may be incorporated by saturation of the amplifier 76 and a separate limiting circuit may not be necessary.

The dashed lines connecting the clutch 80 between the mechanical summing point 62 and the inputs from the pedals and airframe represent load paths between these elements. The operating characteristics of the clutch 80 are indicated by the diagram within the clutch 80. It may be desirable when substantial linkage exists between the actuator and the pilot in the series embodiment to account for the static rigging force 82 of this linkage. This static rigging force 82 will permit the clutch to remain inactive for very small command signals generating loads in the actuator which could be supported by this rigging force. These characteristics are shown in greater detail in FIG. 4 for absolute values of the command voltage $V_I$. The holding force $F_B$ of the clutch is zero for values of the input signal between zero and $V_{I0}$. For command signals between $V_{I0}$ and $V_{B_{max}}$ established by the limiter 78, the holding force of the brake increases proportionally from point (a) to point (b). The dead band could be created by diodes in the amplifier 78 or might be established by a high threshold voltage of the clutch 80. An actuator which operates in parallel with the pilot control linkage cannot rely upon any static rigging force to support the actuator control loads and consequently the characteristic curve for the clutch voltage in the parallel embodiment is represented by the dotted curve which intersects the origin of the graph.

In an alternate embodiment, the signal driving the clutch 80 can be derived directly from a high level output voltage of the LVDT 66. The disadvantage of deriving the control signal for the clutch 80 from the LVDT 66 is that a delay in actuating the brake arises from the servoactuator 56. If the static rigging force is sufficiently large to support the small forces initially generated by the actuator 56, the delay in actuation may not prove detrimental.

In still another embodiment of the invention, a high-level voltage signal can be derived from the preamplifier 52. The undesirable feature of deriving a control signal from a preamplifier 52, however, is that this signal carries a reversing characteristic generated by the feedback network. This reversing characteristic of the voltage would cause the restraining force of the brake to pass through a null position while the actuator was under load. In most systems, this would not be tolerable, unless a high static rigging force would support the majority of the feedback forces.

Another feature of the invention which is particularly suited to the yaw damping embodiment in FIG. 3 is the provision for locking the clutch 80 for maximum load restraint in order to introduce a continuous command signal from a navigation instrument. If the pilot wishes to fly along a specific course under commands from the autopilot, he will relinquish heading control to the autopilot. Consequently, applying a brake at its maximum load to lock up the pilot's control linkage is of no consequence.

This feature of the invention is provided by a heading lock input switch 84, from a power source (not shown), which energizes a heading command instrument such as a magnetic gyro compass 86. The control signal from the compass 86 is introduced into the summing amplifier and operates the actuator 58 to drive the yaw control mechanism. At the same time that the compass 86 is energized by the switch 84, the energizing voltage is also applied through conductor 88 to the amplifier 76 in order to drive the output of the limiter to its maximum voltage and lock the clutch 80. Since the signal is applied through the limiter 78, the clutch 80 will only be locked at the preselected load level which permits the pilot to override the actuator in the event of "hard-over" command or other failure of the control system. With the clutch locked at this load level, command loads generated by the actuator will be fed to the yaw control mechanism to hold the aircraft on heading. When the pilot wishes to assume control of the aircraft heading, he opens the switch 84 to deenergize the compass 86 and removed the locking signal from the amplifier 76.

It should be understood that the invention is not limited to the particular embodiments shown and described herein, but that various changes and modifications may be made without departing from the spirit or scope of this novel concept as defined by the following claims.

I claim:

1. In an aircraft control system having a pilot-operated control linkage with an actuator for introducing a comand signal, the improvement comprising:
   (a) controllable coupling means for connecting the actuator between the aircraft and the control linkage with a variable coupling force; and
   (b) driving means for controlling the force of the coupling means in response to the comand signal.

2. In an aircraft control linkage operated by a pilot, the improvement comprising:
   (a) an actuator for introducing a command quantity;
   (b) connecting means operatively associated with the actuator for transmitting actuator command loads between the aircraft and the linkage, the connecting means being adjustable to limit the maximum load transmitted;
   (c) control means for adjusting the maximum load transmitted by the connecting means in response to the command quantity introduced by the actuator.

3. An aircraft control mechanism for introducing a comand signal into a pilot-operated control linkage comprising:
   (a) an actuator having first and second elements movable with respect to one another in response to the command signal, the first element being connected to the control linkage to move therewith;
   (b) a load-reacting coupling connected between the second element of the actuator and the aircraft to react the actuator control loads against the aircraft, the coupling being adjustable to vary the control load capable of being reacted by the coupling against the aircraft; and
   (c) means responsive to the command signal for adjusting the coupling to match the control load generated by the actuator.

4. An aircraft control apparatus for introducing a command signal comprising:
   (a) a pilot-operated control linkage;
   (b) an actuator having first and second elements movable with respect to one another, the first element being connected to the control linkage to move the linkage in response to the command signal;
   (c) a coupling interposed between the second element of the actuator and the aircraft and including first and second members having an adjustable force-resisting connection, one of the members being engaged with the second element of the actuator and the other member being engaged with the aircraft whereby the coupling resists control loads generated by the actuator with an adjustable force; and (d) signal responsive control means connected to the coupling for varying the resisting force of the coupling in response to the command signal operating the actuator.

5. Apparatus according to claim 4 wherein the resisting force varies by the signal responsive control means is proportional to the command signal.

6. Apparatus according to claim 5 wherein the signal responsive control means includes means for limiting the resisting force of the coupling to a preselected maximum, the maximum being selected to permit the pilot to override the actuator at all times.

7. An aircraft control mechanism in which a command signal is introduced into a pilot-operated control linkage to move a control device comprising:
  (a) an actuator operated by the command signal and having an output member connected to the control linkage leading to the control device;
  (b) an adjustable brake interposed between the actuator and the aircraft and permitting the actuator to be held within the aircraft with limited restraint; and
  (c) a controller operatively associated with the adjustable brake and responsive to the command signal to vary the restraint of the brake in accordance with the command signal.

8. Apparatus according to claim 7 wherein:
  (a) the actuator is an extendible link forming a portion of the pilot-operated control linkage; and
  (b) the adjustable brake is connected to the control linkage at a point in the linkage between the pilot and the actuator.

9. Apparatus in an aircraft for introducing a command signal into a pilot-operated control linkage comprising:
  (a) an actuator mounted to the aircraft and having an output member movable in response to the command signal;
  (b) a slip clutch interposed between the actuator and the pilot-operated control linkage for transmitting the movements of the output member to the control linkage, the clutch being adjustable to limit the maximum load transmitted by the clutch; and
  (c) adjusting means operatively associated with the clutch for receiving the command signal and controlling the maximum load transmitted by the clutch in proportion to the magnitude of the command signal.

10. An aircraft control apparatus having a pilot-operated control linkage comprising:
  (a) a stabilizing instrument which produces a control signal;
  (b) a servoactuator having an output member movable in response to the control signal from the stabilizing instrument, the movable member being mechanically connected to the pilot-operated control linkage to stabilize the aircraft;
  (c) a slip clutch interposed between the actuator and the aircraft for reacting control loads produced by the actuator, the clutch being adjustable to vary the control load at which the clutch slips; and
  (d) driver means operatively connected to the slip clutch for adjusting the load at which the clutch slips in response to the control signal produced by the statilizing instrument for the servoactuator.

11. Apparatus according to claim 10 wherein the driving means includes a limiter adjusted to a preselected control signal level to prevent the load at which the clutch slips from exceeding a maximum load, the preselected control signal level being selected to permit the pilot to slip the clutch at the maximum load.

12. Apparatus according to claim 11 wherein:
  (a) the stabilizing instrument is a yaw rate gyro;
  (b) an aircraft heading command instrument having an operative and non-operative condition is included for introducing a signal into the actuator to hold aircraft heading; and
  (c) a switch is provided for placing the heading command instrument in the operative condition and simultaneously energizing the driving means to the preselected control signal level, whereby the heading command instrument controls the aircraft through the actuator and the pilot may override the heading command instrument.

References Cited

UNITED STATES PATENTS

| | | | |
|---|---|---|---|
| 2,352,334 | 6/1944 | Macomber | 244—85 |
| 2,581,250 | 1/1952 | Garside | 244—85 XR |
| 2,623,717 | 12/1952 | Price | 244—82 |

ANDREW H. FARRELL, Primary Examiner.

U.S. Cl. X.R.
74—479; 244—85, 76